United States Patent [19]

Yoshihara et al.

[11] Patent Number: 4,677,688
[45] Date of Patent: Jun. 30, 1987

[54] RADIO TRANSCEIVER INCLUDING AN ANTENNA SWITCHING CIRCUIT

[75] Inventors: Shigeo Yoshihara; Hideo Miyashita, both of Tokyo, Japan

[73] Assignee: NEC Corporation, Tokyo, Japan

[21] Appl. No.: 694,884

[22] Filed: Jan. 25, 1985

[30] Foreign Application Priority Data

Jan. 27, 1984 [JP] Japan ............................ 59-10742[U]

[51] Int. Cl.$^4$ ............................................. H04B 1/46
[52] U.S. Cl. ......................................... 455/82; 455/83
[58] Field of Search ..................... 455/78, 79, 80, 82, 455/83; 333/103, 104

[56] References Cited

U.S. PATENT DOCUMENTS

| 3,117,241 | 1/1964 | Paynter et al. | 455/82 |
| 3,227,954 | 1/1966 | Fichter, Jr. | 455/82 |
| 3,327,215 | 6/1967 | Battin et al. | 455/83 |
| 3,452,299 | 6/1969 | Angel | 455/83 |
| 4,055,807 | 10/1977 | Priniski et al. | 455/83 |

FOREIGN PATENT DOCUMENTS 73533  5/1982  Japan ..................... 455/83

Primary Examiner—Jin F. Ng

[57] ABSTRACT

A radio transceiver, improved in that an antenna switching circuit is so connected between an antenna and the transmitting and receiving sections of the transceiver that a filter for removing spurious emission components from a transmitted wave is connected only to the transmitting section of the transceiver, whereby insertion loss of a received wave is avoided.

3 Claims, 2 Drawing Figures

RADIO TRANSCEIVER INCLUDING AN ANTENNA SWITCHING CIRCUIT

BACKGROUND OF THE INVENTION

The present invention relates to a radio transceiver (simplex radio transmitter/receiver) and, more particularly, to an improvement in an antenna switching circuit associated with a radio transceiver.

In a radio transceiver, an arrangement is generally made to selectively connect a transmitter and a receiver to an antenna via an antenna switching circuit which is responsive to a transmission/reception control signal, thereby transmitting or receiving such a radio signal as a frequency modulated signal. The antenna switching circuit associated with the radio transceiver includes a nonlinear diode which, during a receive mode operation of the transceiver, generates spurious emission in response to a large power transmission signal which is delivered from the transmitter. Heretofore, the spurious emission has been removed by disposing in a common transmission/reception path between the antenna and the antenna switching circuit a filter made up of an inductor and a capacitor, e.g. a low pass filter. The problem with the filter scheme for the removal of spurious emission is that when it comes to a receive mode operation the filter entails a decrease in reception sensitivity complementary to an insertion loss attributable thereto.

SUMMARY OF THE INVENTION

It is therefore an object of the present invention to provide a high sensitivity radio transceiver which is free from the above-discussed problem and includes an improved antenna switching circuit.

In accordance with the present invention, there is provided an improved a radio transceiver including an antenna; a transmitter; a receiver; an antenna switching circuit for selectively connecting the transmitter and the receiver to the antenna in response to a transmission/reception control signal; the antenna switching circuit being made up of a series connection of a first diode and an inductor, and a second diode; and a filter connected to the antenna and the antenna switching circuit. The series connection is connected between one end of the filter adjacent to the antenna and a given potential point. A junction of the first diode and the inductor is connected to an input of the receiver. The second diode is connected between the other end of the filter and an output of the transmitter.

BRIEF DESCRIPTION OF THE DRAWINGS

The above and other objects, features and advantages of the present invention will become more apparent from the following detailed description taken with the accompanying drawings in which.

DETAILED DESCRIPTION OF THE INVENTION

Figure 1:
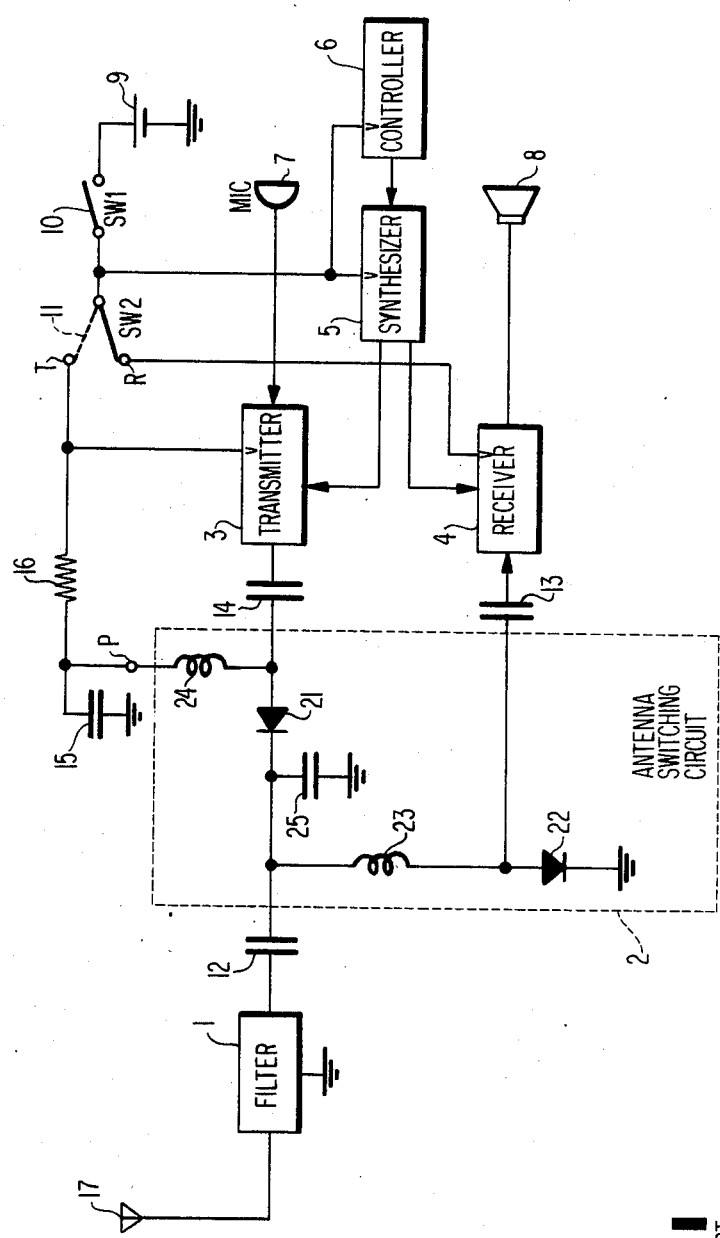
FIG. 1 is a circuit diagram of a prior art radio transceiver.

Referring to FIG. 1 of the drawings, a prior art radio transceiver with an antenna switching circuit is shown. When a power switch 10 is closed, a battery 9 feeds a DC power voltage to a synthesizer 5 and a controller 6. The controller 6 then applies a channel designation signal to the synthesizer 5 so as to set up a transmit and receive frequency associated with a transmitter 3 and a receiver 4. During a receive mode operation, when a switch 11 such as a press-to-talk switch is actuated into connection with a terminal labeled R in the drawing, the DC power voltage is routed to the receiver 4 and not to the transmitter 3 or an antenna switching circuit, generally 2. This renders the receiver 4 active and the transmitter 3 inactive to thereby render diodes 21 and 22 nonconductive. In this condition, the diode 21 serves as an isolator for electrically isolating the filter 1 and the transmitter 3 from each other so that an inductor 23 provides a $\pi$ tuning circuit combined with a capacitor 25 and the residual capacitance of the diode 22. Therefore, a signal coming in through an antenna 17 is routed through the filter (low pass filter, for example) 1, a coupling capacitor 12, the $\pi$ tuning circuit and a coupling capacitor 13 to the receiver 4. After being amplified, frequency converted, and demodulated by the receiver 4, the received signal is emitted from a loudspeaker 8 as voice.

For a transmit mode operation, on the other hand, the switch 11 is connected to the other terminal, labeled T. Then, the DC power voltage is applied directly to the transmitter 3 and, via a resistor 16, to a P terminal of the antenna switching circuit 2 to activate the transmitter 3. DC power current flows from the P terminal of the antenna switching circuit 2 to ground via an inductor 24, the diode 21, inductor 23 and diode 22, rendering the diodes 21 and 22 conductive. As a result, the diode 21 connects the transmitter 3 to the filter 1, while the inductor 23 and capacitor 25 provide a parallel resonance circuit for a transmission signal. An audio signal from a microphone 7, therefore, is frequency modulated, frequency converted, and amplified by the transmitter 3. A radio signal output from the transmitter 3 is sequentially passed through a coupling capacitor 14, the diode 21, coupling capacitor 12 and filter 1 to be transmitted over the antenna 17.

The nonlinear diode 21 generates spurious emission in response to the large power transmission signal from the transmitter 3. The filter 1 is employed to eliminate the spurious emission and is essential to a transmit circuit. However, with respect to a receive circuit, the filter 1 constitutes an insertion loss element which is detrimental to reception sensitivity as previously discussed.

The reference numeral 15 in FIG. 1, designates a bypass capacitor.

Figure 2:
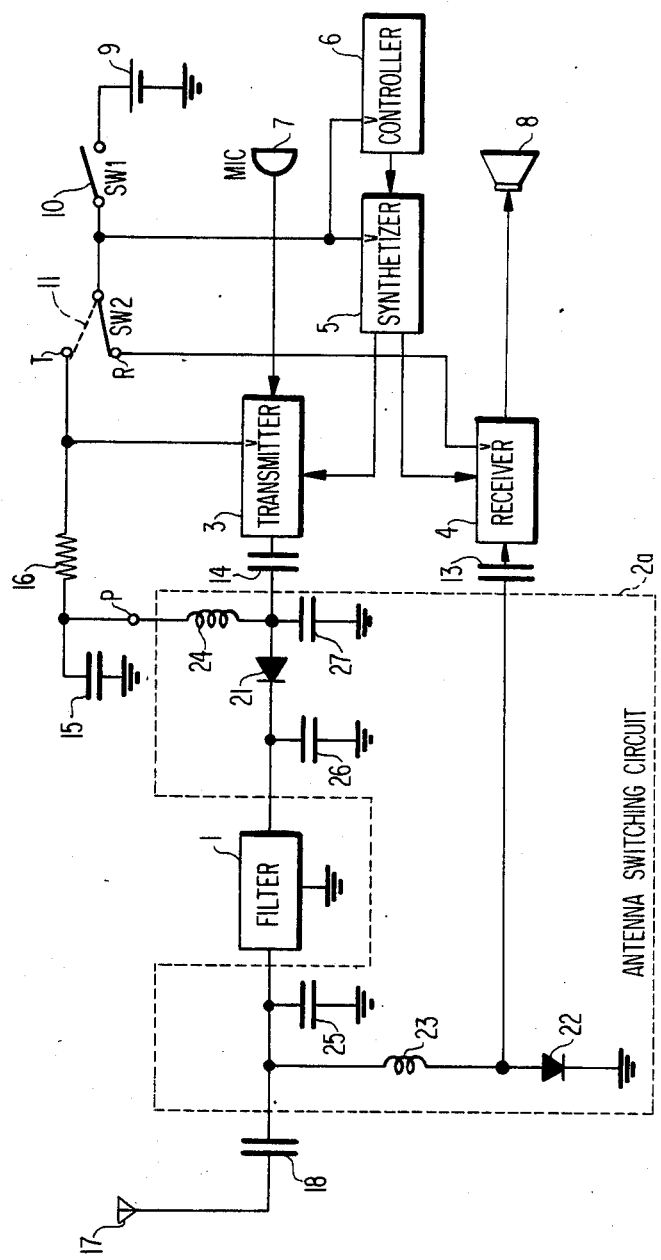
FIG. 2 is a circuit diagram of a radio transceiver embodying the present invention.

Referring to FIG. 2, there is shown a radio transceiver in accordance with the present invention which includes an improved antenna switching circuit for enhancing reception sensitivity. In FIG. 2, the same or similar structural elements as those shown in FIG. 1 are designated by like reference numerals and detailed description thereof will be omitted for simplicity.

The improved antenna switching circuit, generally 2a, is characterized in that a series connection of a diode 22 and an inductor 23 is provided between one end of a filter 1. adjacent to an antenna 17 and ground, in that the junction of the diode 22 and inductor 23 is connected to a receiver 4, and in that a diode 21 is interposed between the other end of the filter 1 and a transmitter 3.

During a receive mode operation, a switch 11 is connected to a terminal R as indicated by a solid line in FIG. 2. In this condition, a DC power voltage from a battery 9 is fed to the receiver 4 and not to the transmitter 3 or the antenna switching circuit 2a, so that diodes 21 and 22 become nonconductive. The transmitter 3, therefore, is electrically isolated from the antenna 17 side. The filter 1, combined with an impedance circuit 26 such as a capacitor, has a high impedance with respect to the antenna 17. Meanwhile, the inductor 23 cooperates with a capacitor 25 and the residual capacitance of the diode 22 to complete a $\pi$ tuning circuit. In the network thus conditioned, a radio signal picked up by the antenna 17 is routed to the receiver 4 by way of a coupling capacitor 18, the inductor 23 and a capacitor 13. The receiver 4 demodulates the input radio signal in the previously described manner and the resulting audio signal comes out through a loudspeaker 8.

For a transmit mode operation, the switch 11 is turned to a T side as indicated by a phantom line in FIG. 2. Then, the power voltage is fed to the transmitter 3 and antenna switching circuit 2a. As a result, the DC power current flows from the P terminal of the circuit 2a to ground via an inductor 24, the diode 21, filter 1, inductor 23 and diode 22, whereby the diodes 21 and 22 become conductive. The impedance circuit 26, therefore, is coupled to an impedance circuit comprising an inductor 24 and a capacitor 27 to provide a parallel resonance circuit associated with the transmission signal frequency. An audio signal output from a microphone 7 is modulated, frequency converted, and amplified by the transmitter 3, and, passed through a capacitor 14, the diode 21, filter 1 and capacitor 18 to be transmitted over the antenna 17.

In summary, it will be seen that the present invention provides a radio receiver which, due to the filter 1 inserted in a transmission path only, frees a transmission wave from spurious components and subjects a received wave to no insertion loss and, thereby, enhances reception sensitivity.

What is claimed is:

1. In a radio transceiver including an antenna; a transmitter; a receiver; an antenna switching circuit for selectively connecting the transmitter and the receiver to the antenna in response to a transmission/reception control signal; the antenna switching circuit being made up of a series connection of a first diode and an inductor, and a second diode; and a filter connected to the antenna and the antenna switching circuit, the improvement wherein the series connection is connected between one end of the filter adjacent to the antenna and a given potential point, a junction of the first diode and the inductor being connected to an input of the receiver, the second diode being connected between the other end of the filter and an output of the transmitter.

2. The improvement as claimed in claim 1, wherein the filter comprises a low pass filter.

3. The improvement as claimed in claim 2, wherein an impedance circuit is provided at each of opposite ends of the second diode, said impedance circuit during a receive mode operation becoming a high impedance with respect to the antenna side in combination with the filter and during a transmit mode operation providing a resonance circuit for a transmission signal from the transmitter.

* * * * *